United States Patent
Takiue

(10) Patent No.: US 10,308,766 B2
(45) Date of Patent: Jun. 4, 2019

(54) SOLVENT SOLUBLE POLYIMIDE COPOLYMER

(71) Applicant: SOMAR CORPORATION, Tokyo (JP)

(72) Inventor: Yoshiyasu Takiue, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 0 days.

(21) Appl. No.: 14/897,511

(22) PCT Filed: Apr. 17, 2014

(86) PCT No.: PCT/JP2014/060976
§ 371 (c)(1),
(2) Date: Dec. 10, 2015

(87) PCT Pub. No.: WO2014/199724
PCT Pub. Date: Dec. 18, 2014

(65) Prior Publication Data
US 2016/0159985 A1 Jun. 9, 2016

(30) Foreign Application Priority Data

Jun. 14, 2013 (JP) ................................. 2013-126043

(51) Int. Cl.
*C08G 73/10* (2006.01)
*C09D 179/08* (2006.01)
*C09J 179/08* (2006.01)

(52) U.S. Cl.
CPC ....... *C08G 73/1067* (2013.01); *C08G 73/105* (2013.01); *C08G 73/1042* (2013.01); *C08G 73/1064* (2013.01); *C08G 73/1071* (2013.01); *C09D 179/08* (2013.01); *C09J 179/08* (2013.01)

(58) Field of Classification Search
CPC ............ C08G 73/1067; C08G 73/1082; C08G 73/1042
See application file for complete search history.

(56) References Cited

U.S. PATENT DOCUMENTS

| | | | |
|---|---|---|---|
| 4,629,777 A | 12/1986 | Pfeifer | |
| 4,698,295 A * | 10/1987 | Pfeifer | ................... C07C 63/04 427/503 |
| 4,932,982 A | 6/1990 | Hayes | |
| 5,554,684 A | 9/1996 | Choi | |
| 2008/0044681 A1 | 2/2008 | Yamaguchi | |
| 2008/0241497 A1 | 10/2008 | Yamaguchi | |

FOREIGN PATENT DOCUMENTS

| | | |
|---|---|---|
| CN | 1170474 A | 1/1998 |
| CN | 101068851 A | 11/2007 |
| CN | 101274992 A | 10/2008 |
| JP | S59-219330 A | 12/1984 |
| JP | 03-065228 A | 3/1991 |
| JP | H11-236447 A | 8/1999 |
| JP | 2011-122079 A | 6/2011 |

OTHER PUBLICATIONS

Grubb et al (Highly soluble polyimides from sterically hindered diamines, Polymer 40 (1999) 4279-4288), Nov. 1999.*
Chinese Office Action dated Feb. 4, 2017 in Chinese Patent Application No. 201480033940.9 (8 Pages).

* cited by examiner

Primary Examiner — Gregory Listvoyb
(74) Attorney, Agent, or Firm — Birch, Stewart, Kolasch & Birch, LLP

(57) ABSTRACT

Provided is a solvent-soluble polyimide copolymer which satisfies storage stability and heat resistance at high levels and has excellent utility. The polyimide copolymer is obtained by copolymerizing (A) 3,3',4,4'-biphenyltetracarboxylic dianhydride with (B) diamine(s) and/or diisocyanate(s) and has no glass transition temperature observed at lower than 500° C. The component (B) is preferably at least one diamine and/or diisocyanate represented by the following Formulae (1) to (3):

(wherein, X represents an amino group or an isocyanate group; $R^1$ to $R^8$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^8$ is not a hydrogen atom).

1 Claim, No Drawings

SOLVENT SOLUBLE POLYIMIDE COPOLYMER

TECHNICAL FIELD

The present invention relates to a solvent-soluble polyimide copolymer (hereinafter, also simply referred to as "polyimide copolymer"). More particularly, the present invention relates to a solvent-soluble polyimide copolymer which satisfies storage stability and heat resistance at high levels and has excellent utility.

BACKGROUND ART

Among organic materials, polyimides are polymeric materials that have the highest levels of heat resistance, chemical resistance and electrical insulating properties. In the electrical and electronic industry, for example, "KAPTON (registered trademark)" manufactured by DuPont, which is polymerized from pyromellitic dianhydride (PMDA) and 4,4'-diaminodiphenyl ether (pDADE), and "UPILEX (registered trademark)" manufactured by Ube Industries, Ltd., which is polymerized from biphenyltetracarboxylic dianhydride (BPDA) and p-phenylene diamine (pPD), are widely used as heat-resistant insulating materials. However, polyimides have a drawback of being hardly soluble in organic solvents as an adverse effect of having excellent chemical resistance. Thus, polyimides have poor processability and are mainly distributed in the film forms.

Polyimide films are produced by dissolving an acid dianhydride having two acid anhydride groups in the molecule and a diamine having two amino groups in the molecule in a solvent to prepare a polyimide precursor varnish called "polyamic acid", coating and drying this precursor varnish, and then heating the resultant at about 350° C. It has been strongly desired to handle polyimides in a solution state, and a number of developments have been made in solvent-soluble polyimides.

However, in order to obtain a solvent-soluble polyimide, it is generally required to use monomers having high solubility, that is, low heat resistance; therefore, the resulting polyimide has a low heat resistance and a low chemical resistance. Meanwhile, as a method of handling a polyimide as a solution without sacrificing heat resistance and chemical resistance, there is a method in which a user forms a coating film with a polyamic acid solution and subsequently performing imidization. However, since not only the handling and storage thereof are difficult because polyamic acid solution is easily affected by the humidity but also a heat treatment at about 350° C. is required for imidization of polyamic acid, the use of a polyamic acid solution is limited to coating on heat-resistant materials. Under such circumstances, examples of a technology relating to a solvent-soluble polyimide include those disclosed in Patent Documents 1 and 2.

RELATED ART DOCUMENTS

Patent Documents

Patent Document 1: Japanese Unexamined Patent Application Publication No. 2011-122079

Patent Document 2: Japanese Unexamined Patent Application Publication No. S59-219330

SUMMARY OF THE INVENTION

Problems to be Solved by the Invention

However, in the polyimide copolymers obtained in Patent Documents 1 and 2, in exchange of solubilization thereof to organic solvents, the heat resistance and the mechanical strength are reduced. Meanwhile, at present, improvements in the heat resistance and the mechanical strength for remedying these problems do not necessarily yield satisfactory results from the practical standpoint in that, for example, to maintain the polyimide copolymers in a state of being dissolved in an organic solvent is made difficult and the storage stability is reduced.

In view of the above, an object of the present invention is to provide a solvent-soluble polyimide copolymer which satisfies storage stability and heat resistance at high levels and has excellent utility.

Means for Solving the Problems

The present inventor intensively studied to solve the above-described problems and consequently discovered that a polyimide copolymer having no glass transition temperature at lower than 500° C. can be obtained by copolymerizing a prescribed acid dianhydride with a diamine and/or a diisocyanate, thereby completing the present invention.

That is, the solvent-soluble polyimide copolymer of the present invention is characterized in that it is obtained by copolymerizing (A) 3,3',4,4'-biphenyltetracarboxylic dianhydride and (B) diamine(s) and/or diisocyanate(s) and has no glass transition temperature observed at lower than 500° C.

In the solvent-soluble polyimide copolymer of the present invention, it is preferred that the component (B) be at least one diamine and/or diisocyanate represented by the following Formulae (1) to (3):

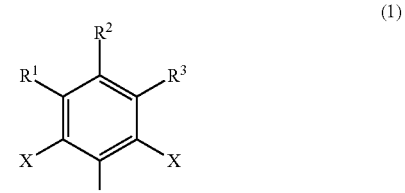

(1)

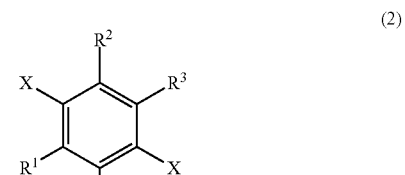

(2)

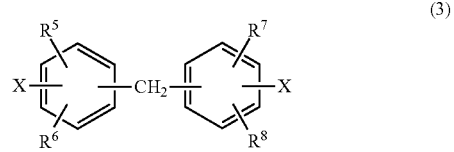

(3)

(wherein, X represents an amino group or an isocyanate group; $R^1$ to $R^8$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^8$ is not a hydrogen atom).

Further, in the solvent-soluble polyimide copolymer of the present invention, it is preferred that two of the $R^1$ to $R^4$ be ethyl groups and the other two be a methyl group and a hydrogen atom. Still further, it is preferred that the $R^5$ to $R^8$ be each a methyl group or an ethyl group.

Effects of the Invention

According to the present invention, a solvent-soluble polyimide copolymer which satisfies storage stability and heat resistance at high levels and has excellent utility can be provided.

MODE FOR CARRYING OUT THE INVENTION

Modes for carrying out the present invention will now be described in detail.

The solvent-soluble polyimide copolymer of the present invention is obtained by copolymerizing (A) 3,3',4,4'-biphenyltetracarboxylic dianhydride and (B) diamine(s) and/or diisocyanate(s). As compared to conventional polyimide copolymers, the above-described polyimide copolymer has a higher glass transition temperature with no glass transition temperature observed at lower than 500° C. and shows superior heat resistance. In addition, the polyimide copolymer also has an advantage of having superior storage stability.

In the polyimide copolymer of the present invention, the (B) diamine and/or diisocyanate is not particularly restricted, and any known diamine and/or diisocyanate can be used. For example, the (B) diamine and/or diisocyanate is preferably at least one selected from the group consisting of compounds represented by the following Formulae (4) to (13):

(4)
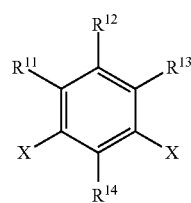

(5)
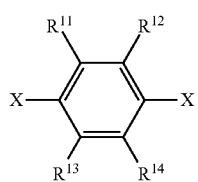

(6)
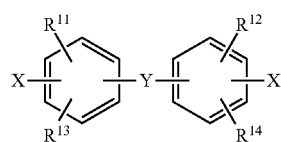

(7)
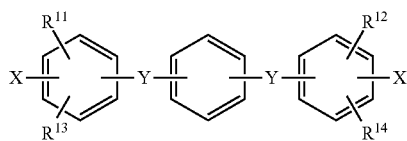

(8)
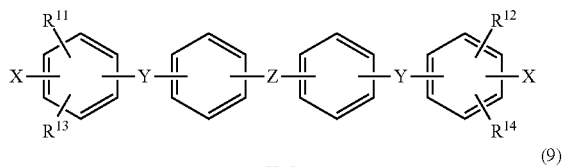

(9)
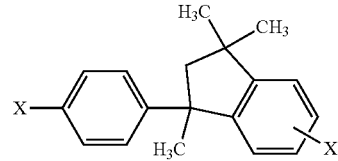

(10)
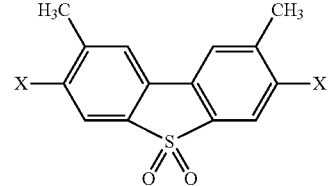

(11)
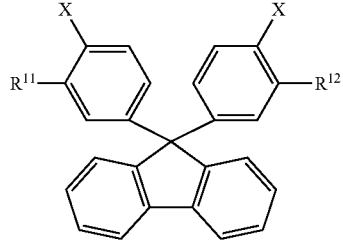

(12)
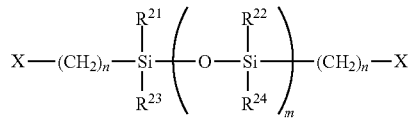

n = 1~5
m = 1~30

(13)
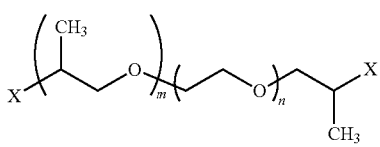

m, n = 1~30

(wherein, X represents an amino group or an isocyanate group; $R^1$ to $R^{14}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group; Y and Z each represent

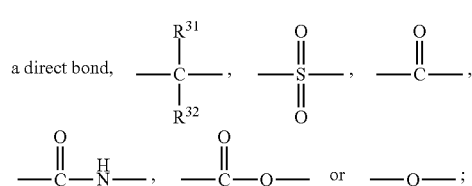

$R^{21}$ to $R^{24}$ each independently represent an alkyl group having 1 to 4 carbon atoms or a phenyl group; $R^{31}$ and $R^{32}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group).

In the polyimide copolymer of the present invention, it is preferred that the component (B) be at least one diamine and/or diisocyanate represented by the following Formulae (1) to (3):

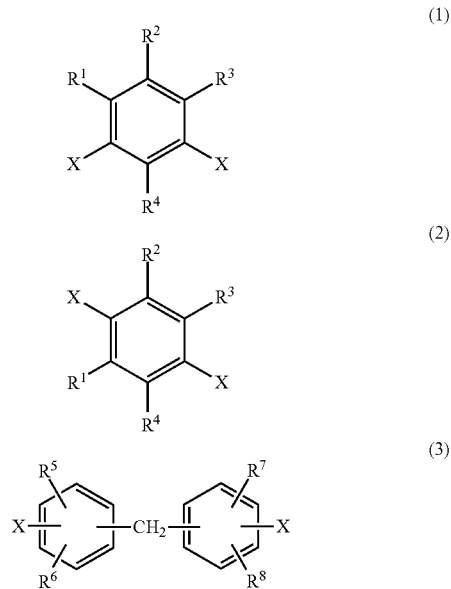

(wherein, X represents an amino group or an isocyanate group; $R^1$ to $R^8$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^8$ is not a hydrogen atom). Particularly, diethyltoluene diamine (DETDA) represented by the Formula (1) or (2) wherein two of the $R^1$ to $R^4$ are ethyl groups and the other two are a methyl group and a hydrogen atom, which can be easily and inexpensively obtained and allows the effects of the present invention to be favorably exerted, is preferred. In the Formula (3), it is preferred that the $R^5$ to $R^8$ be each a methyl group or an ethyl group.

In the polymerization of the polyimide copolymer of the present invention, as long as the resulting polyimide copolymer can attain the effects of the present invention, in addition to (A) 3,3',4,4'-biphenyltetracarboxylic dianhydride, (C) a second acid dianhydride may be further copolymerized as an acid dianhydride. The (C) second acid dianhydride is not particularly restricted as long as it is an acid dianhydride conventionally used in the production of a polyimide and, for example, 4,4'-oxydiphthalic dianhydride, 3,3',4,4'-diphenylsulfonetetracarboxylic dianhydride, 3,3',4,4'-benzophenonetetracarboxylic dianhydride, 2,2'-bis[(dicarboxyphenoxy)phenyl]propane dianhydride, ethylene glycol-bis-trimellitic anhydride ester, pyromellitic dianhydride or 3,3',4,4'-biphenyltetracarboxylic dianhydride can be preferably used. As the (C) second acid dianhydride, these acid dianhydrides may be used individually, or two or more thereof may be used in combination. The amount of the (C) second acid dianhydride is preferably 1.5 mol or less with respect to 1 mol of the component (A).

For the production of the polyimide copolymer of the present invention, the components (A) and (B) can be copolymerized. Alternatively, an oligomer of polyimde copolymer having a mass-average molecular weight of 550 to 16,000 or so can be produced first by copolymerizing the components (A) and (B) and the polyimide copolymer may then be produced by copolymerizing the thus obtained oligomer of polyimde copolymer with the (C) second acid dianhydride and/or (D) a second diamine and/or diisocyanate. In this case, as the (D) second diamine and/or diisocyanate, any diamine and/or diisocyanate usually used in the production of a polyimide copolymer can be used within a range that does not impair the effects of the present invention, and the (D) second diamine and/or diisocyanate may be the same as the component (B). In cases where a diamine and/or a diisocyanate different from the component (B) is/are used as the (D) second diamine and/or diisocyanate, the amount thereof is preferably 2 mol or less with respect to 1 mol of the component (B).

The polyimide copolymer of the present invention has a weight-average molecular weight of preferably 20,000 to 200,000, more preferably 35,000 to 150,000. When the weight-average molecular weight of the polyimide copolymer is outside this range, the ease of handling is deteriorated. In cases where the polyimide copolymer of the present invention is dissolved in an organic solvent, the concentration of the polyimide copolymer in the organic solvent can be, for example, but not particularly restricted to, 5 to 35% by mass or so. The polyimide copolymer can be used even at a concentration of less than 5% by mass; however, when the concentration is low, the efficiency of operations such as coating of the polyimide copolymer is degraded. Meanwhile, when the concentration exceeds 35% by mass, the fluidity of the polyimide copolymer is poor and coating and the like of the polyimide copolymer is thus difficult, which also lead to deterioration of the workability.

The polyimide copolymer of the present invention can be dissolved in an organic solvent and, as this organic solvent, for example, N-methyl-2-pyrrolidone, N,N-dimethylacetamide, sulfolane, N,N-dimethylformamide, N,N-diethylacetamide, gamma-butyrolactone, alkylene glycol monoalkyl ether, alkylene glycol dialkyl ether, alkylcarbitol acetate or benzoic acid ester can be used. These organic solvents may be used individually, or two or more thereof may be used in combination.

When producing an article article using the polyimide copolymer of the present invention, the production method is not particularly restricted and a known method can be employed. Examples thereof include a method in which the polyimide copolymer of the present invention is coated on the surface of a substrate and the resultant is then dried to remove a solvent(s) by evaporation, followed by molding into the form of a coating film, a film or a sheet; and a method in which the polyimide copolymer of the present invention is injected into a die and a solvent(s) is/are then removed by evaporation to obtain a molded article.

As a method of forming a coating film, a film or a sheet from the polyimide copolymer of the present invention, the polyimide copolymer of the present invention can be coated on the surface of a substrate by a known method such as spin coating, dip coating, spray coating or casting in accordance with the viscosity and the like thereof and subsequently dried.

As the substrate, an arbitrary substrate may be used in accordance with the intended use of the final product. Examples of the material of the substrate include fiber products such as clothes; glasses; synthetic resins such as polyethylene terephthalate, polyethylene naphthalate, polyethylene, polycarbonate, triacetylcellulose, cellophane, polyimide, polyamide, polyphenylene sulfide, polyether imide, polyether sulfone, aromatic polyamide and polysulfone; metals; ceramics; and papers. The substrate may be transparent or colored with various pigments or dyes mixed into the material constituting the substrate, or the surface of the substrate may be coated with a resin containing various pigments or dyes. Further, the surface of the substrate may be processed into a mat form by, for example, physical etching such as sand blasting, chemical etching with a chemical solution or formation of irregularities by coating with a filler-containing resin, or an adhesion-promoting layer may be formed on the surface by plasma treatment, corona treatment, primer coating or the like.

For drying of the thus coated polyimide copolymer of the present invention, a conventional heat-drying furnace can be used. Examples of the atmosphere inside the drying furnace include air and inert gases (nitrogen and argon). The drying temperature can be selected as appropriate in accordance with the boiling point of the solvent in which the polyimide copolymer of the present invention is dissolved, and it may be usually 80 to 350° C., preferably 100 to 320° C., particularly preferably 120 to 250° C. The drying time can be selected as appropriate in accordance with the thickness, concentration and solvent type, and it may be 1 second to 360 minutes or so.

After the drying, a product having the polyimide copolymer of the present invention as a coating film can be directly obtained, or the resulting coating film can be separated from the substrate to obtain a film.

In cases where a molded article is produced using the polyimide copolymer of the present invention, for example, a filler such as silica, alumina, mica, carbon powder, a pigment, a dye, a polymerization inhibitor, a thickening agent, a thixotropic agent, a suspending agent, an antioxidant, a dispersant, a pH adjuster, a surfactant, various organic solvents and various resins can be added.

Further, in cases where a molded article is obtained using a die, a molded article can be obtained by injecting a prescribed amount of the polyimide copolymer of the present invention into a die (particularly preferably a rotary die) and subsequently drying the injected polyimide copolymer at the same temperature for the same time period as in the molding conditions of a film or the like.

The polyimide copolymer of the present invention has excellent heat resistance and is, therefore, useful for coating agents, adhesives, insulation coating materials such as electric wires, inks, paints, interlayer insulation films, ultra-thin films and the like that are required to have heat resistance.

Next, the method of producing the solvent-soluble polyimide copolymer of the present invention will be described. In order to obtain the polyimide copolymer, either a thermal imidization method which thermally carries out dehydration ring-closure or a chemical imidization method using a dehydrating agent can be employed. The thermal imidization method and the chemical imidization method will be described below in detail in the order mentioned.

<Thermal Imidization Method>

The polyimide copolymer of the present invention can be obtained by copolymerizing the components (A) and (B) and, as described above, in the production of the polyimide copolymer of the present invention, (C) a second acid dianhydride may also be added as an acid dianhydride other than the component (A) within a range that does not impair the effects of the present invention.

In the production of the polyimide copolymer of the present invention, it is preferred that the polycondensation temperature be 150 to 200° C. and the polycondensation time be 60 to 600 minutes. When the polycondensation temperature is higher than 200° C., oxidation of the solvent and unreacted materials occurs and the resin concentration is increased due to evaporation of the solvent, which are not preferred. Meanwhile, when the polycondensation temperature is lower than 150° C., there may be a case where the imidization reaction does not progress or is not completed, which is also not preferred.

In the production of the polyimide copolymer of the present invention, the copolymerization process is performed in an organic solvent, and the organic solvent used in this process is not particularly restricted. For example, N-methyl-2-pyrrolidone, N,N-dimethylacetamide, sulfolane, N,N-dimethylformamide, N,N-diethylacetamide, gamma-butyrolactone, alkylene glycol monoalkyl ether, alkylene glycol dialkyl ether, alkylcarbitol acetate or benzoic acid ester can be preferably used. These organic solvents may be used individually, or two or more thereof may be used in combination. Further, in the production of the polyimide copolymer of the present invention, a known imidization catalyst can be used. For example, pyridine can be usually used as an imidization catalyst; however, in addition thereto, examples of the imidization catalyst include substituted or unsubstituted nitrogen-containing heterocyclic compounds; N-oxide compounds of nitrogen-containing heterocyclic compounds; substituted or unsubstituted amino acid compounds; and hydroxyl group-containing aromatic hydrocarbon compounds and aromatic heterocyclic compounds. Particularly, for example, a lower alkyl imidazole such as 1,2-dimethylimidazole, N-methylimidazole, N-benzyl-2-methylimidazole, 2-methylimidazole, 2-ethyl-4-methylimidazole or 5-methylbenzimidazole, an imidazole derivative such as N-benzyl-2-methylimidazole, a substituted pyridine such as isoquinoline, 3,5-dimethylpyridine, 3,4-dimethylpyridine, 2,5-dimethylpyridine, 2,4-dimethylpyridine or 4-n-propylpyridine, or p-toluenesulfonic acid can be preferably used. The amount of the imidization catalyst to be used is 0.01 to 2 times equivalent, particularly preferably 0.02 to 1 time equivalent or so, with respect to the amic acid unit of polyamic acid. By using the imidization catalyst, the physical properties of the resulting polyimide, particularly the elongation and the breakage resistance, may be improved.

Further, in the production of the polyimide copolymer of the present invention, in order to efficiently remove water generated by the imidization reaction, an azeotropic solvent can be added to the organic solvent. As the azeotropic solvent, for example, an aromatic hydrocarbon such as toluene, xylene or solvent naphtha, or an alicyclic hydrocarbon such as cyclohexane, methylcyclohexane or dimethylcyclohexane can be used. When an azeotropic solvent is used, it is added in an amount of 1 to 30% by mass or so, preferably 5 to 20% by mass, with respect to the total amount of the organic solvent.

<Chemical Imidization Method>

In cases where the polyimide copolymer of the present invention is produced by a chemical imidization method, in the copolymer production step of copolymerizing the components (A) and (B), for example, in an organic solvent, a dehydrating agent such as acetic anhydride and a catalyst such as triethylamine, pyridine, picoline or quinoline are added to a polyamic acid solution and the same operations as in the thermal imidization method are subsequently performed. By this, the polyimide copolymer of the present invention can be obtained. In cases where the polyimide copolymer of the present invention is produced by such a chemical imidization method, the polycondensation temperature and the reaction time are usually preferred to be in a range of normal temperature to about 150° C. and 1 to 200 hours.

In the production of the polyimide copolymer of the present invention, a dehydrating agent is used, and the dehydrating agent is, for example, an organic acid anhydride such as an aliphatic acid anhydride, an aromatic acid anhydride, an alicyclic acid anhydride or a heterocyclic acid anhydride, or a mixture of two or more thereof. Specific examples of the organic acid anhydride include acetic anhydride.

In the production of the polyimide copolymer of the present invention, an imidization catalyst and an organic solvent are used, and these can be the same ones as those used in the thermal imidization method.

<Production of Polyimide Copolymer>

In the production of the polyimide copolymer of the present invention, polycondensation can be carried out by any known method and the polycondensation method is not particularly restricted. For example, a method in which the entire amount of the component (A) is added to organic solvent and polycondensation is carried out by subsequently adding the component (B) to this organic solvent in which the component (A) has been dissolved may be employed, or a method in which the entire amount of the component (B) is added to an organic solvent in advance and polycondensation is carried out by subsequently adding the component (A) to this organic solvent in which the component (B) has been dissolved may be employed.

In the production of the polyimide copolymer of the present invention, in cases where an oligomer of polyimde copolymer is produced by copolymerizing the components (A) and (B) and a polyimide copolymer is then produced using the thus obtained oligomer of polyimde copolymer, as described above, the oligomer of polyimde copolymer may also be copolymerized with (D) second diamine and/or diisocyanate along with (C) second acid dianhydride. As the (C) second acid dianhydride and the (D) second diamine and/or diisocyanate, those mentioned above can be used.

As organic solvent, catalyst, azeotropic solvent and dehydrating agent to be used in the production of the oligomer of polyimde copolymer, the organic solvent, catalyst, azeotropic solvent and dehydrating agent that are used in the above-described production of the polyimide copolymer of the present invention can be selected as appropriate based on each imidization method.

In the production of the oligomer of polyimde copolymer, in cases where a thermal imidization method is employed, the polycondensation temperature is 150 to 200° C. When the polycondensation temperature is lower than 150° C., there may be a case where imidization does not progress or is not completed, whereas when the polycondensation temperature is higher than 200° C., oxidation of the solvent and unreacted materials occurs and the resin concentration is increased due to evaporation of the solvent. The polycondensation temperature is preferably 160 to 195° C.

EXAMPLES

The present invention will now be described in more detail by way of examples thereof.

Example 1

To a 500-mL separable four-necked flask equipped with a stainless steel anchor stirrer, a nitrogen-introducing tube and a Dean-Stark trap, 66.52 g (0.225 mol) of BPDA, 32.09 g (0.18 mol) of DETDA, 100 g of N-methyl-2-pyrrolidone (NMP), 3.56 g of pyridine and 50 g of toluene were poured, and the atmosphere in the reaction system was replaced with nitrogen. The reaction mixture was stirred for 30 minutes at 80° C. under nitrogen gas flow to dissolve BPDA, and the resultant was then heated to 180° C. and stirred under heating for 2 hours. Water generated by the reaction was removed from the reaction system by azeotropic distillation with toluene.

Next, after cooling the reaction mixture to 120° C., 9.01 g (0.045 mol) of pDADE and 84.22 g of NMP were added, and the resultant was stirred for 5 minutes. Then, the resulting mixture was heated to 180° C. and allowed to react for 6 hours under heating and stirring. Water generated by this reaction was removed from the reaction system as an azeotropic mixture with toluene and pyridine. After the completion of the reaction, 212.56 g of NMP was added when the reaction mixture was cooled to 120° C., thereby obtaining a polyimide solution having a concentration of 20% by mass. The thus obtained polyimide copolymer had a structure represented by the following Formula (14):

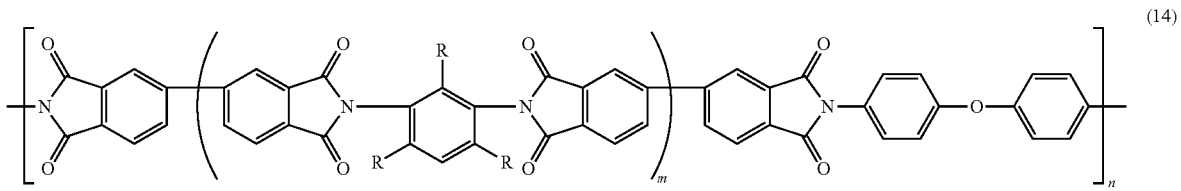

(14)

(wherein, R is a methyl group or an ethyl group).

Example 2

To the same apparatus as used in Example 1, 41.49 g (0.141 mol) of BPDA, 33.52 g (0.188 mol) of DETDA, 84.89 g of NMP, 3.72 g of pyridine and 50 g of toluene were poured, and the atmosphere in the reaction system was replaced with nitrogen. The reaction mixture was stirred for 30 minutes at 80° C. under nitrogen gas flow to dissolve BPDA, and the resultant was then heated to 180° C. and stirred under heating for 2 hours. Water generated by the reaction was removed from the reaction system by azeotropic distillation with toluene. Next, after cooling the reaction mixture to 130° C., 12.52 g (0.047 mol) of 1-(4-aminophenyl)-1,3,3-trimethyl-1H-inden-5(or 6)-amine (TMDA) and 50 g of NMP were added, and the resultant was stirred for 5 minutes. Then, 20.74 g (0.094 mol) of PMDA and 50 g of NMP were further added, and the resulting mixture was heated to 180° C. and allowed to react for 6 hours under heating and stirring. Water generated by this reaction was removed from the reaction system as an azeotropic mixture with toluene and pyridine. After the completion of the reaction, 113.78 g of NMP was added when the reaction mixture was cooled to 120° C., thereby obtaining a polyimide solution having a concentration of 25% by mass. The thus obtained polyimide copolymer had a structure represented by the following Formula (15):

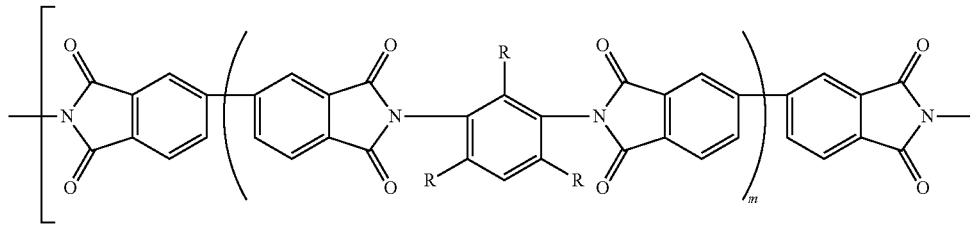

(15)

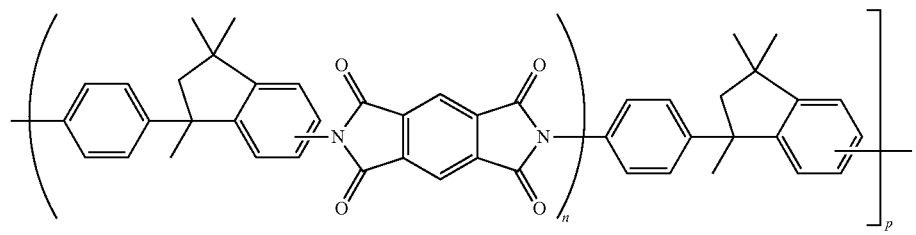

(wherein, R is a methyl group or an ethyl group).

Example 3

To the same apparatus as used in Example 1, 40.60 g (0.138 mol) of BPDA, 16.40 g (0.092 mol) of DETDA, 83.69 g of NMP, 2.91 g of pyridine and 50 g of toluene were poured, and the atmosphere in the reaction system was replaced with nitrogen. The reaction mixture was stirred for 30 minutes at 80° C. under nitrogen gas flow to dissolve BPDA, and the resultant was then heated to 180° C. and stirred under heating for 2 hours. Water generated by the reaction was removed from the reaction system by azeotropic distillation with toluene.

Next, after cooling the reaction mixture to 130° C., 32.06 g (0.092 mol) of 9,9-bis(4-aminophenyl)fluorene (FDA) and 60 g of NMP were added, and the resultant was stirred for 5 minutes. Then, 16.86 g (0.046 mol) of 3,3',4,4'-diphenyl-sulfonetetracarboxylic dianhydride (DSDA) and 40 g of NMP were further added, and the resulting mixture was heated to 180° C. and allowed to react for 6 hours under heating and stirring. Water generated by this reaction was removed from the reaction system as an azeotropic mixture with toluene and pyridine. After the completion of the reaction, 113.04 g of NMP was added when the reaction mixture was cooled to 120° C., thereby obtaining a polyimide solution having a concentration of 25% by mass. The thus obtained polyimide copolymer had a structure represented by the following Formula (16):

(16)

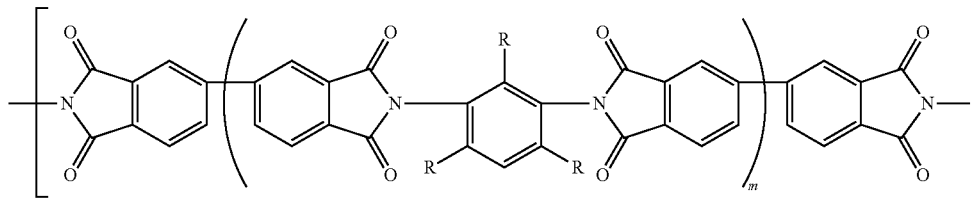

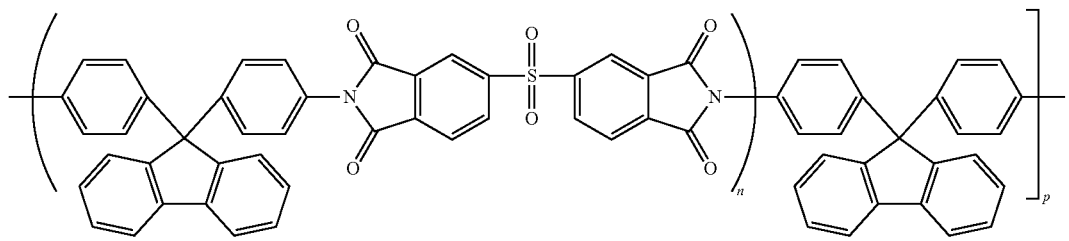

(wherein, R is a methyl group or an ethyl group).

Example 4

To the same apparatus as used in Example 1, 36.19 g (0.123 mol) of BPDA, 25.46 g (0.082 mol) of 4,4'-methyl-enebis(2,6-diethylaniline) (M-DEA), 83.86 g of NMP, 2.60 g of pyridine and 50 g of toluene were poured, and the atmosphere in the reaction system was replaced with nitrogen. The reaction mixture was stirred for 30 minutes at 80° C. under nitrogen gas flow to dissolve BPDA, and the resultant was then heated to 180° C. and stirred under heating for 2 hours. Water generated by the reaction was removed from the reaction system by azeotropic distillation with toluene.

Next, after cooling the reaction mixture to 130° C., 28.57 g (0.082 mol) of FDA and 60 g of NMP were added, and the resultant was stirred for 5 minutes. Then, 15.07 g (0.041 mol) of DSDA and 40 g of NMP were further added, and the resulting mixture was heated to 180° C. and allowed to react for 6 hours under heating and stirring. Water generated by this reaction was removed from the reaction system as an azeotropic mixture with toluene and pyridine. After the completion of the reaction, 113.04 g of NMP was added when the reaction mixture was cooled to 120° C., thereby obtaining a polyimide solution having a concentration of 25% by mass. The thus obtained polyimide copolymer had a structure represented by the following Formula (17):

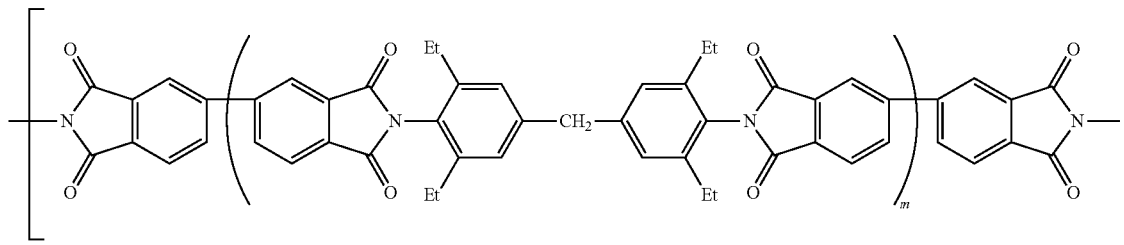

(17)

with toluene and pyridine. After the completion of the reaction, the reaction mixture was cooled to 120° C., thereby obtaining a polyimide solution having a concentration of 20% by mass. The thus obtained polyimide copolymer had a structure represented by the following Formula (18):

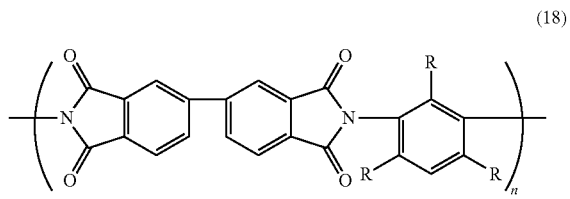

(18)

(wherein, R is a methyl group or an ethyl group).

Example 6

To the same apparatus as used in Example 1, 47.08 g (0.16 mol) of BPDA, 17.68 g (0.08 mol) of PMDA, 42.79 g (0.24 mol) of DETDA, 183.23 g of NMP, 3.8 g of pyridine and 50 g of toluene were poured, and the atmosphere in the reaction system was replaced with nitrogen. The reaction mixture was stirred for 30 minutes at 80° C. under nitrogen gas flow to dissolve BPDA and PMDA, and the resultant was then heated to 180° C. and stirred under heating for 6 hours. Water generated by this reaction was removed from the reaction system as an azeotropic mixture with toluene and pyridine. After the completion of the reaction, 112.76 g of NMP was added when the reaction mixture was cooled to 120° C., thereby obtaining a polyimide solution having a concentration of 25% by mass. The thus obtained polyimide copolymer had a structure represented by the following Formula (19):

Example 5

To the same apparatus as used in Example 1, 35.31 g (0.12 mol) of BPDA, 21.39 g (0.12 mol) of DETDA, 209.50 g of NMP, 1.90 g of pyridine and 50 g of toluene were poured, and the atmosphere in the reaction system was replaced with nitrogen. The reaction mixture was stirred for 30 minutes at 80° C. under nitrogen gas flow to dissolve BPDA, and the resultant was then heated to 180° C. and stirred under heating for 6 hours. Water generated by this reaction was removed from the reaction system as an azeotropic mixture

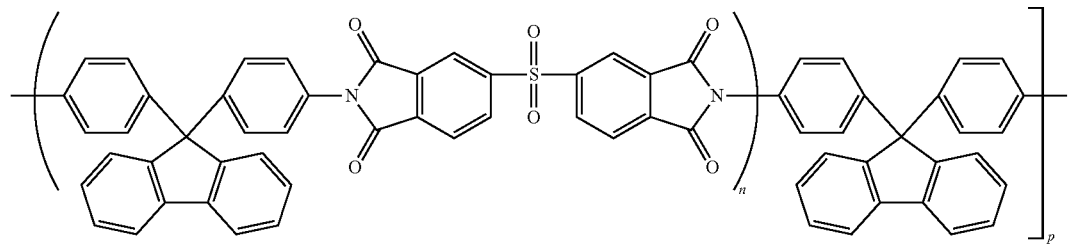

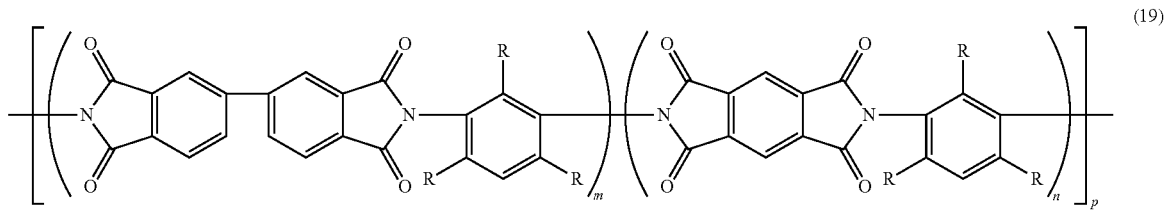

(19)

(wherein, R is a methyl group or an ethyl group).

Comparative Example 1

To the same apparatus as used in Example 1, 46.58 g (0.13 mol) of DSDA, 56.22 g (0.13 mol) of bis[4-(4-aminophenoxy)phenyl]sulfone (pBAPS), 182.22 g of NMP, 2.06 g of pyridine and 50 g of toluene were poured, and the atmosphere in the reaction system was replaced with nitrogen. The reaction mixture was stirred for 30 minutes at 80° C. under nitrogen gas flow to dissolve DSDA, and the resultant was then heated to 180° C. and stirred under heating for 6 hours. Water generated by this reaction was removed from the reaction system as an azeotropic mixture with toluene and pyridine. After the completion of the reaction, 112.13 g of NMP was added when the reaction mixture was cooled to 120° C., thereby obtaining a polyimide solution having a concentration of 25% by mass.

Comparative Example 2

To the same apparatus as used in Example 1, 38.25 g (0.13 mol) of BPDA, 56.22 g (0.13 mol) of pBAPS, 269.37 g of NMP, 2.06 g of pyridine and 50 g of toluene were poured, and the atmosphere in the reaction system was replaced with nitrogen. The reaction mixture was stirred for 30 minutes at 80° C. under nitrogen gas flow to dissolve BPDA, and the resultant was then heated to 180° C. and stirred under heating for 6 hours. Water generated by this reaction was removed from the reaction system as an azeotropic mixture with toluene and pyridine. After the completion of the reaction, 192.40 g of NMP was added when the reaction mixture was cooled to 120° C., thereby obtaining a polyimide solution having a concentration of 20% by mass.

Film-Forming Property

The polyimide copolymers obtained in Examples and Comparative Examples were each coated on a silicon wafer by a spin coating method and then pre-dried for 10 minutes on a 120° C. hot plate. The resulting pre-dried film was detached from the silicon wafer, fixed on a stainless steel frame and subsequently dried at 180° C. for 1 hour, at 250° C. for 30 minutes and then at 320° C. for 1 hour. As for the evaluation of the film-forming property, an evaluation "x" was given when the film could not maintain a film shape by itself when detached from the silicon wafer after the pre-drying at 120° C.; an evaluation "Δ" was given when the film was able to maintain a film shape by itself after the completion of the drying at 250° C. but the film was so brittle that it could not maintain the film shape after the drying at 320° C.; and an evaluation "o" was given when the film was able to maintain a film shape by itself even after the completion of the drying at 320° C. The results thereof are shown in Tables 1 and 2.

<Glass Transition Temperature>

Using the films prepared for the evaluation of the film-forming property, the glass transition temperature was measured. For the measurement, DSC6200 (manufactured by Seiko Instruments Inc.) was employed. Each film was heated to 500° C. at a heating rate of 10° C./min, and the midpoint glass transition temperature was adopted as the glass transition temperature. The results thereof are shown in Tables 1 and 2.

<5% Thermal Weight Loss Temperature>

Using the films prepared for the evaluation of the film-forming property, the 5% thermal weight loss temperature was measured. For the measurement, TG/DTA6200 (manufactured by Seiko Instruments Inc.) was employed. As for the heating condition, each film was heated at a rate of 10° C./min, and the temperature at which the mass was reduced by 5% was measured and defined as the 5% thermal weight loss temperature. The results thereof are shown in Tables 1 and 2.

<Mechanical and Physical Properties>

The films prepared for the evaluation of the film-forming property were each processed into a test piece of 100 mm in length×10 mm in width, and the tensile elastic modulus, tensile strength and elongation were measured using a creep meter (RE2-33005B, manufactured by Yamaden Co., Ltd.). Each measurement was performed 5 times, and the data showing the maximum value in tensile strength was adopted. The chuck distance was 50 mm and the tensile rate was 5 mm/sec.

TABLE 1

| | Example 1 | Example 2 | Example 3 | Example 4 |
|---|---|---|---|---|
| Storage stability | o | o | o | o |
| Glass transition temperature (° C.) | 500 or higher | 500 or higher | 500 or higher | 500 or higher |
| 5% thermal weight loss (° C.)* | 515.9 | 515.9 | 523.7 | 477.9 |
| Film-forming property | o | o | o | o |
| Tensile elastic modulus (GPa) | 2.02 | 1.79 | 2.40 | 2.82 |
| Tensile strength (MPa) | 125.29 | 104.48 | 125.00 | 32.7 |
| Elongation (%) | 15.32 | 13.47 | 10.95 | 3.48 |

*5% thermal weight loss temperature

TABLE 2

| | Example 5 | Example 6 | Comparative Example 1 | Comparative Example 2 |
|---|---|---|---|---|
| Storage stability | o | o | o | o |
| Glass transition temperature (° C.) | 500 or higher | 500 or higher | 291 | 267 |
| 5% thermal weight loss (° C.)* | 523.0 | 503.9 | 511.2 | 490 |
| Film-forming property | o | o | o | o |

TABLE 2-continued

|  | Example 5 | Example 6 | Comparative Example 1 | Comparative Example 2 |
|---|---|---|---|---|
| Tensile elastic modulus (GPa) | 2.01 | 1.72 | 1.11 | 1.27 |
| Tensile strength (MPa) | 114.64 | 109.85 | 75.3 | 83.6 |
| Elongation (%) | 9.96 | 14.31 | 8.2 | 9.2 |

According to Tables 1 and 2, the polyimide copolymers of the present invention are soluble to the several kinds of solvents while having no glass transition temperature at lower than 500° C. and show excellent heat resistance. Further, it is also seen that the polyimide copolymers of the present invention have sufficient mechanical strength. On the other hand, it is seen that, since the polyimide copolymers of Comparative Examples 1 and 2 do not have a structure in which the components (A) and (B) are polymerized, they both have a low glass transition temperature and a low mechanical strength and are thus not capable of withstanding practical use.

The invention claimed is:

1. A solvent-soluble polyimide copolymer obtained by copolymerizing (A) 3,3',4,4'-biphenyltetracarboxylic dianhydride, (B) diamine(s) and/or diisocyanate(s), (C) dianhydride(s) other than (A), and (D) diamine(s) and/or diisocyanate(s) other than (B), said solvent-soluble polyimide copolymer having no glass transition temperature observed at lower than 500° C.,
wherein said component (B) is at least one diamine and/or diisocyanate represented by the following Formulae (1) to (2):

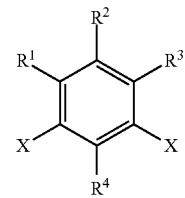

(1)

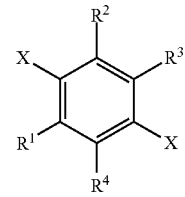

(2)

wherein, X represents an amino group or an isocyanate group; wherein two of said $R^1$ to $R^4$ are ethyl groups and the other two are a methyl group and a hydrogen atom, wherein said component (C) is selected from the group consisting of 4,4'-oxydiphthalic dianhydride, 3,3',4,4'-diphenylsulfonetetacarboxylic dianhydride, 3,3',4,4'-benzophenonetetracarboxylic dianhydride, 2,2'-bis[(dicarboxyphenoxy)phenyl]propane dianhydride, ethylene glycol-bis-trimellitic anhydride ester, pyromellitic dianhydride and 3,3',4,4'-biphenyltetracarboxylic dianhydride.

* * * * *